July 8, 1941.     B. H. BENSON ET AL     2,248,739
TIRE
Filed Jan. 15, 1940     2 Sheets-Sheet 1
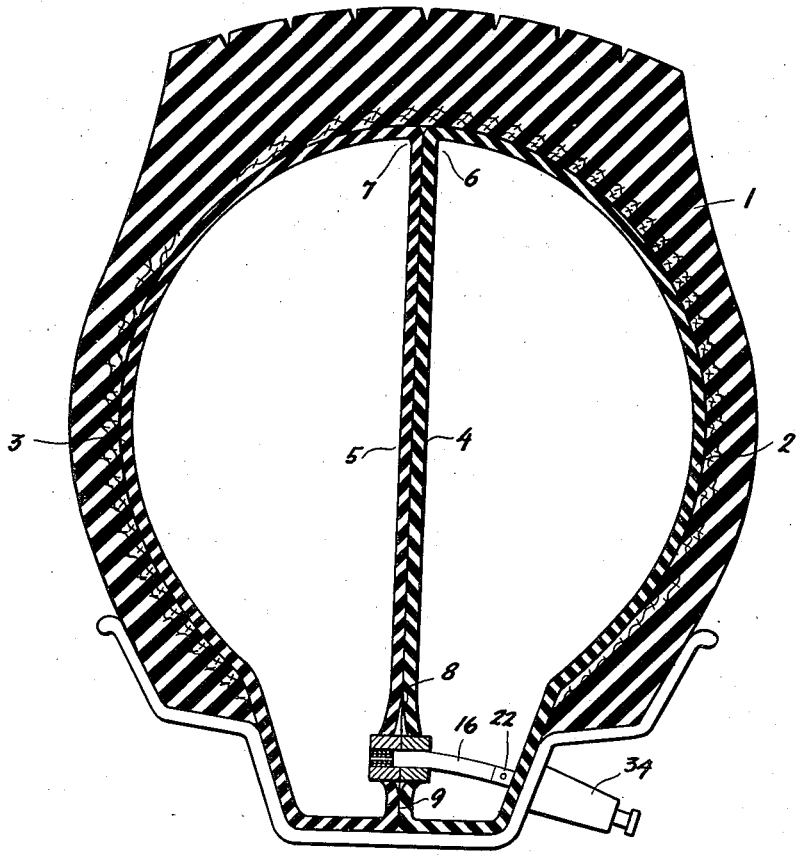
Fig.1
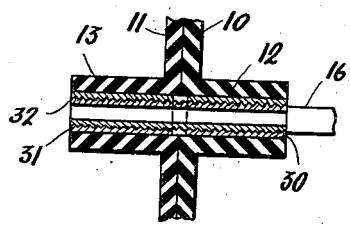
Fig.A
Inventor
Benjamin Howard Benson
Bernard E. Mendelsohn
by
Ezekiel Wolf
their Attorney

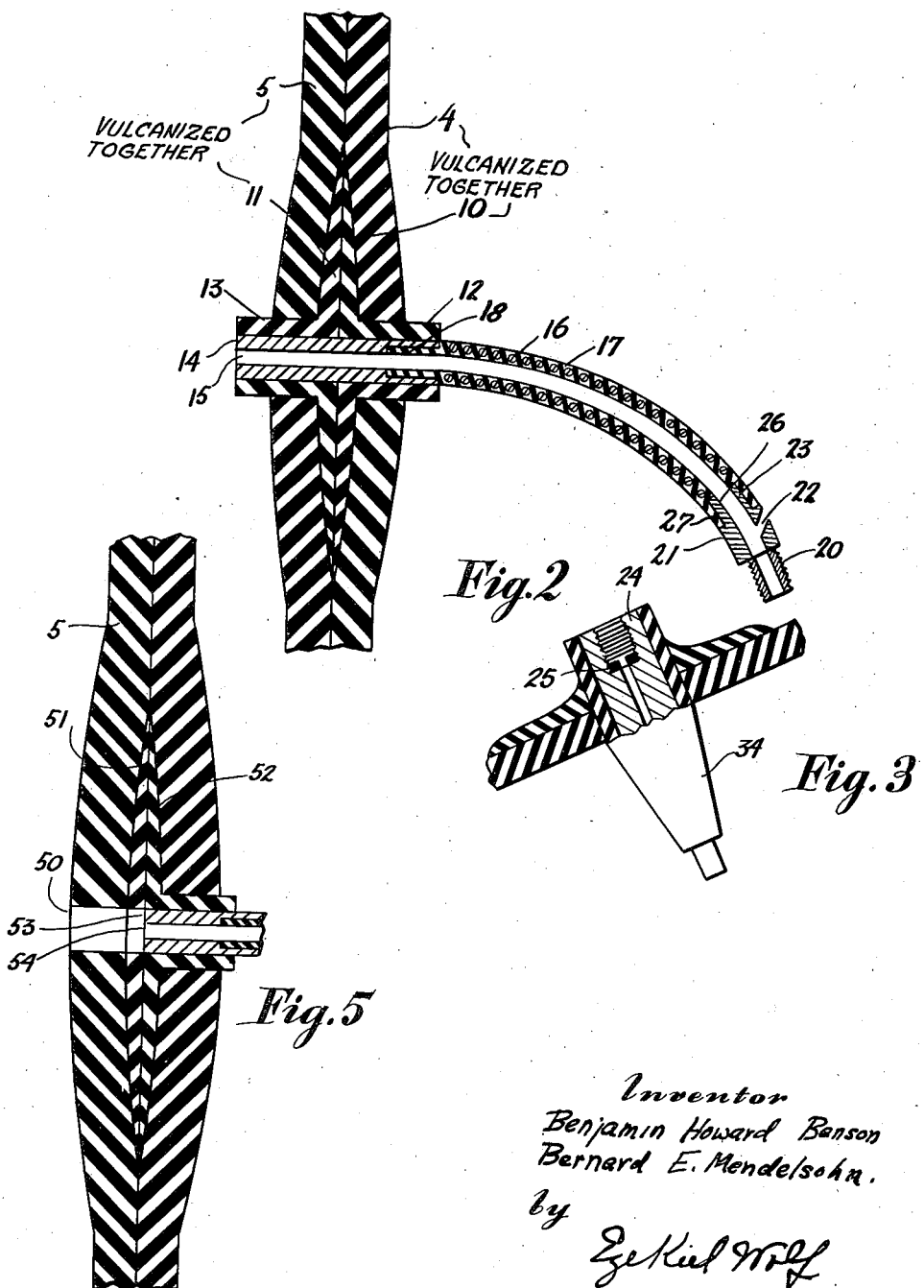

Patented July 8, 1941

2,248,739

UNITED STATES PATENT OFFICE 2,248,739

TIRE

Benjamin Howard Benson and Bernard E. Mendelsohn, Brookline, Mass.

Application January 15, 1940, Serial No. 313,819

9 Claims. (Cl. 152—341)

The present invention relates to automobile tire construction and more particularly to the art of safety tubes. In this art various types of inner tube construction has been used including the use of two twin semi-circular section tubes of the type disclosed in applicants' Patent No. 2,152,131, of which the present application is an improvement.

The protection of automobile tires against blowouts in the use of the construction of the present invention depends upon both twin tubes occupying equal or approximately equal volume, so that when a blow-out occurs, a definite known volume will be available to support the automobile casing. The construction of the present invention will assure this feature.

In the construction according to the present invention, the space within the automobile tire casing is occupied by inflatable rubber tubes each occupying one half of the space in the casing. These tubes are preferably arranged vertically in the tire casing with central walls facing each other, and are sealed only around the section where the air is conducted from one tube to the other. It is not necessary in this construction that the tubes be sealed off tightly from one another, it being preferable to seal the section of the walls of the tubes around the air connection and make the air connection from one tube to the other such that the air transfer between the tubes is small. This construction will be more readily understood from the further discussion in the specification. While the air connection between the two tubes may be in the center of their abutting walls of the tubes, as in the drawing shown in our prior patent, nevertheless, it is preferable and a feature of the present invention to locate the conducting elements at the base of the tube.

Further improvements and advantages are to be found in the present invention in other constructional features which will be more fully understood and described in connection with the drawings, in which:

Figure 1 shows a section through a tire tube showing the present invention.

Figure 2 shows an enlarged view of a detail of Figure 1.

Figure 3 shows an enlarged view of another detail of Figure 1.

Figure 4 shows a modified construction of a portion of a detail shown in Figure 2, and, Figure 5 shows a detail of a further modification.

In Figure 1 a tire casing 1 is filled out on the inside by twin tubes 2 and 3 having central or vertical abutting walls 4 and 5 abutting when inflated, but ordinarily formed as any single tubes without special change of shape when uninflated. The flat abutting walls 4 and 5 are continuous with the walls abutting the casing and the corners 6 and 7 which continue in a smooth curve to join together the abutting wall 4 and 5, and the walls lying against the inside of the tire casing. The walls 4 and 5 are free from each other except in the section extending approximately between the points 8 and 9, which section of the tube is reproduced in more complete section in Figure 2. Referring both to Figures 1 and 2, it will be noted that on the outside of each of the walls 4 and 5, there is a thin flange or disc 10 and 11, each of which is provided with bushings 12 and 13, extending through openings in the tube. These flanges and bushings are made of suitable materials and are vulcanized or cured directly to the tubes. Further the flat surfaces of the flanges 10 and 11 are faced to each other and aligned so that the opening in the bushings will match each other when the whole assembly is completed. These flanges further are cemented face to face over their whole surface area so that they are air tight and seal the air from escaping within the tubes. Within the bushings or collars 12 and 13, there is positioned the metallic tube 14 with a definitely chosen bore or opening 15 into the rubber tube 3. The tube 14 is preferably brass or other similar material and is inserted in the bushings 12 and 13 without sealing the pipe in the tubes. The pipe 14 is cemented at the end to the rubber tube 16 which is of hard rubber construction with a helical spring 17 reinforcing its walls. This is accomplished by cementing the end of the tube 16 which is provided with a nipple 18 into the recess in the tube 14. The tube 16 at its other end carries a threaded collar 20 with a shoulder 21 in which there is an air outlet 22 inclined at an angle with the tube bore 23 so that as the air is forced into the tube from the valve end, it is gently diverted through the opening 22 thus providing a free passage to the inside of the tube. The threaded collar 20 threads into the valve seat 24 and forms with the collar or ring 25 an air seal preventing air from escaping into the tube except through the opening 22. The shoulder 21 is also provided with an end collar or nipple 26 which is cemented into the end 27 of the rubber tube 16.

In Figure 4 is shown a preferred embodiment of the invention. In this case there is permanently fixed within each of the collars 12 and 13, brass bushings 30 and 31 respectively which are just short of extending to the outer face of the flanges 10 and 11. As has been stated, these bushings are permanently fixed in the collars 12 and 13. Therefore the pipe 32 is also threaded so that it may be screwed into the threaded bushings. This pipe 32 connects to the pipe 16 corresponding to 16 of Figure 2 and has at its end the same rubber tube connection corresponding to 16 of Figure 2. In the assembly of the unit the two tubes 2 and 3 are first independent of one another, each tube having sealed therein however the discs or flanges 10 and 11 with the collars or bushings 12 and 13 which form an integral part of the assembly.

In the modification of Figure 4, the brass or metallic bushings 30 and 31 are also sealed and cemented in the rubber bushings 12 and 13. The operator then takes the tube 16 which has its threaded pipe 32 attached at one end and the threaded collar at the other end and inserts the tube 16 through the opening in the wall 4 of the tube 2 from the outside inward. The pipe 32 will be screwed through the bushing 30 as the threaded shoulder 20 is placed in the end of the valve 24, thus setting the end of the tube with an air tight seal on the seat 25 at the inside of the valve. It will be observed of course, that the tube 16 is slightly less in diameter than the bore in the bushings 30 and 31. When this tube 16 has been set in place, cement, or any suitable joining material is applied to the faces of the flanges 10 and 11 and also about the tire wall and then the tube 3 is screwed to the pipe 32 in the bushing 31 until the two faces 10 and 11 are joined in contact with each other. The two surfaces may be clamped to each other by clamping pieces applied to the external sides of the tubes when the tubes are uninflated or if the tire is placed in a form the tubes may be inflated and the pressure within the tubes may be used to force the walls in contact with each other until the seal is made.

The use of a threaded bushing is particularly advantageous in the walls of the tube, first to provide an initial positive attachment before a bond is effected and to help in the cementing process, and secondly, the threaded bushings in the walls of each tube provides an easy and convenient means for inflating the tube in the curing process. The brass thread bushing will in this case serve initially to hold a valve or connection for inflation purposes as the tube is being cured. The valve can then be removed and the bushing will then serve to aid in the pipe connection as illustrated in the construction in the present invention. As the air is pumped in through the valve 34, air enters equally in the tubes 2 and 3 through the equalizing passages 22 and 15. Since the volume and pressure of air in each tube is equal at all times while inflating, there is no air leaking out from one tube to the other, but if more air should enter one tube than the other, the fact that the tubes are not definitely sealed off from the other will tend to equalize the pressure in the tubes. The pipe 16 is preferably positioned at the lower portion of the wall in such a place that the rubber hose connection of the tube 16 is of the length of approximately one inch. Further the hose 16 is extensibly longitudinal so that as the tire tube expands with inflation, the tube 16 will also stretch longitudinally. This also tends to make a firm seal between the threaded shoulder 20 and the threaded end of the valve 34 and further permits the walls to be pressed against each other by their air pressure and thereby eliminating any pull that a stiff and rigid tube might have upon this cemented section. The helical spring in the tube 16 provides not only longitudinal extension, but also provides a resiliency in the bending of the tube and in maintaining a smooth curve from the point of connection of the tube at the valve to the point of connection through the walls of the tube. This insures also equal inflation of the tubes 2 and 3.

Figure 5 shows a modification where the bushing member in the tube 3 is dispensed with. In this modification the wall 5 has an opening 50 surrounded by the flange 51 on its external surface, which flange is adhered on the one face to the outside of the wall 5 and on the other face to the flange 52, corresponding to 10 of Figure 2. The pipe 53 corresponding to that of 14 of Figure 2 has an opening 54 similar to 15 whereby the tube 3 is inflated. The flange 51 must of course be stiff enough to maintain the opening 50 in size and position to permit free access of the air from 54.

Having now described our invention, we claim:

1. In a pneumatic tire casing, inner tube means comprising a pair of twin tubes having abutting central walls, means providing a communicating passage between said central walls near the base of the tubes, said communicating passage extending from the wall of one of said tubes closely adjacent to the base thereof across said tube to the opposite wall thereof, and a valve situated in the base of said opposite wall and connected to said communicating passage.

2. In a pneumatic tire casing, inner tube means comprising a pair of twin tubes having abutting central walls, a flange having a collar on one side extending into and sealed in each of said tubes, said flanges on the other side sealed in face to face relationship, and a non-collapsible hose extending through said collars across the inside of one of said tubes closely adjacent the base thereof, and sealed to a valve connection at the base of said twin tubes, said non-collapsible hose having openings adapted to admit equal volumes of air to each of said twin tubes.

3. In a pneumatic tire casing, inner tube means comprising a pair of twin tubes having abutting central walls, a pair of flanges each having a collar on one side extending into and sealed in each of said twin tubes, a single metallic conduit pipe extending through said collars and having connected thereto at one end, a non-collapsible rubber hose having at its other end a threaded collar, and a valve located in one side of said twin tubes having an internal member adapted to receive said threaded collar said hose extending across the tube closely adjacent the base thereof.

4. In a pneumatic tire casing, inner tube means comprising a pair of twin tubes having abutting central walls, a valve located in the bottom of one of said tubes on the external side thereof away from said central walls, said valve having an internal member adapted to receive an air pipe connection, an air pipe extending from the inside of said valve through an opening in the central walls of said tubes closely adjacent the base thereof, said walls being sealed about said opening through which said pipe enters and air opening elements in said pipe to each of said twin tubes for admitting equal volumes of air to said tubes simultaneously.

5. In a pneumatic tire casing, inner tube means comprising a pair of twin tubes having abutting central walls, flange elements positioned on each of said walls having a collar extending inwardly through the walls forming aligned openings to each of said tubes, said tubes being sealed to one another on said flange surfaces, a threaded metallic bushing sealed in each of said collars and an air pipe connecting element threaded through both of said bushings and having air openings into both of said tubes.

6. In a pneumatic tire casing, inner tube means comprising a pair of twin tubes having abutting central walls, flange elements positioned on each of said walls having a collar extending inwardly through the walls forming aligned openings to each of said tubes, said tubes being sealed to one another on said flange surfaces, a threaded metallic bushing sealed in each of said collars and an air pipe connecting element threaded through both of said bushings and having air openings into both of said tubes, a valve situated in one of said tubes at the base thereof opposite said central wall, said valve having an internal element adapted to receive an air pipe and an air pipe extending from said threaded pipe to said valve and providing an admission of equal volumes of air to each of said twin tubes.

7. In a pneumatic tire casing, inner tube means comprising a pair of twin tubes having abutting central walls, flanges sealed on the external surface of each of said central walls and also sealed in face to face relationship with each other, said flanges and walls having aligned openings therein and a collar provided in said openings for retaining an air pipe, and said air pipe extending closely adjacent the base of the tube from said collar and having connecting means at the other end thereof for receiving air externally of one of said tubes.

8. In a pneumatic tire casing, inner tube means comprising a pair of twin tubes having abutting central walls, openings aligned in said walls with sealing means sealing said walls around said openings, a valve positioned at the lower end of an opposite wall of one of said tubes having an internal element adapted to receive and retain an air pipe extending closely adjacent the base of the tube, and means joining said air pipe at its other end to the opening in said walls said air pipe also having an opening to the twin tube in which the valve is located.

9. In a pneumatic tire casing, inner tube means comprising a pair of twin tubes having abutting central walls, openings aligned in said walls and sealing means sealing said walls together around said openings, a valve positioned at the lower end of an opposite wall of one of said tubes having an internal element receiving and retaining an air pipe, said air pipe having an emission outlet at its end and said air pipe extending to and being connected to said openings to admit air to the other of said twin tubes, and a passage through the wall of said air pipe positioned immediately adjacent the place where said valve is located, said passage being directed at an obtuse angle with reference to the air passage in said air pipe in the direction of the valve, said air emission outlets adapted to admit equal volumes of air to the said tubes

BENJAMIN HOWARD BENSON.
BERNARD E. MENDELSOHN.